United States Patent
Wolf

(10) Patent No.: US 10,253,983 B1
(45) Date of Patent: Apr. 9, 2019

(54) FIRE-STARTING CANTEEN

(71) Applicant: Randy Wolf, Flat Rock, AL (US)

(72) Inventor: Randy Wolf, Flat Rock, AL (US)

( * ) Notice: Subject to any disclaimer, the term of this patent is extended or adjusted under 35 U.S.C. 154(b) by 228 days.

(21) Appl. No.: 15/472,101

(22) Filed: Mar. 28, 2017

(51) Int. Cl.
| | |
|---|---|
| *F23Q 13/00* | (2006.01) |
| *A45F 3/16* | (2006.01) |
| *B65D 25/04* | (2006.01) |
| *B65D 25/42* | (2006.01) |
| *B65D 41/02* | (2006.01) |
| *G02B 19/00* | (2006.01) |
| *G02B 25/00* | (2006.01) |
| *A45F 3/00* | (2006.01) |

(52) U.S. Cl.
CPC .............. *F23Q 13/005* (2013.01); *A45F 3/16* (2013.01); *B65D 25/04* (2013.01); *B65D 25/42* (2013.01); *B65D 41/02* (2013.01); *G02B 19/0042* (2013.01); *G02B 25/002* (2013.01); *A45F 2003/001* (2013.01)

(58) Field of Classification Search
CPC ........ A45F 3/16; A45F 3/18; A45F 2003/001; B65D 25/04; B65D 25/42; B65D 41/02; F23Q 13/00; F23Q 13/005; G02B 19/00; G02B 19/0042; G02B 25/00; G02B 25/002
See application file for complete search history.

(56) References Cited

U.S. PATENT DOCUMENTS

| | | | |
|---|---|---|---|
| 1,081,098 A | 12/1913 | Garza | |
| 4,399,919 A | 3/1983 | Posnansky | |
| 4,557,251 A * | 12/1985 | Burkhardt | F24S 80/60 |
| | | | 126/640 |
| 4,610,240 A * | 9/1986 | Burch | F23Q 13/005 |
| | | | 126/681 |
| 4,696,284 A | 9/1987 | Stowell | |
| 6,124,980 A | 9/2000 | Cerbell | |
| 7,837,865 B2 | 11/2010 | Wadstrom | |
| 9,442,225 B2 | 9/2016 | Batchko et al. | |
| 2010/0308047 A1* | 12/2010 | Regan | A45F 3/18 |
| | | | 220/212.5 |
| 2016/0303748 A1* | 10/2016 | Martinez | G02B 19/0042 |
| 2017/0122559 A1* | 5/2017 | Wick | F23Q 13/005 |

OTHER PUBLICATIONS

Magnifying Lens; http://www.wildwoodsurvival.com/survival/fire/magnifier/index.html; Dec. 5, 2016.

* cited by examiner

*Primary Examiner* — Bryon P Gehman
(74) *Attorney, Agent, or Firm* — Lanier Ford Shaver & Payne PC; Gerald M. Walsh

(57) ABSTRACT

A fire starting canteen that has internal fire starting lenses. The lenses can be solid or water lenses. The canteen has two internal chambers, one for holding water and the other for holding water and forming a fire burning lens. The fire starting canteens can be combined reversibly or permanently to form an inner canteen and an outer canteen with larger water-carrying capacity and fire starting capability than a single canteen. The lenses are, preferably, convex but can also be concave or a combination of both. A divider in the interior of the canteen forms the two internal chambers. The divider has a convex shape and, in combination with the chamber filled with water, forms the fire starting lens.

8 Claims, 4 Drawing Sheets

FIRE-STARTING CANTEEN

FIELD OF THE INVENTION

This invention relates to canteens for storing and drinking water and, more particularly, to such canteens that have one or more fire starting lenses therein to start fires with the canteen using sunlight.

BACKGROUND OF THE INVENTION

The technology of the burning glass or fire starting lens has been known since antiquity. Fire starting lenses are still used to light fires in outdoor and primitive settings. A fire starting lens is simply a small powerful magnifying glass. Any sort of magnifying lens may be used to start a fire on a sunny day. The lens is held at such an angle as to focus the sun's light into as small an area as possible. By placing some tinder under this spot the tinder will soon start to smoke and catch fire.

Campers, hikers, and the like use fire starting lenses to start fires outdoors for cooking, to sterilize water, for warmth, to light up the darkness, and for some degree of protection against animals. They also carry canteens for water. It is known to have one side of a canteen as a lens to heat water within the interior of the canteen, as disclosed in U.S. Pat. No. 4,696,284. There are two chambers in the canteen of this patent, with one being for water and the other for air. The air chamber is positioned between water chamber and the lens. The lens focuses sunlight on the water chamber to heat the water therein. The lens as it is constructed in this canteen is not useful as a fire starting lens. What would be useful, but heretofore unavailable, is a lens in a canteen that can be used as a fire starting lens to start fires.

SUMMARY OF THE INVENTION

The present invention is a canteen having sides, a top portion, and a bottom portion defining an interior, wherein the top portion and the bottom portion allow passage of light. A divider is positioned in the interior forming a first chamber and a second chamber within the interior, wherein the divider allows passage of light. The second chamber forms a fire starting lens in combination with the divider wherein the fire starting lens is a solid lens or a water lens; and the divider has an opening for filling the second chamber with water. Preferably, the fire starting lenses are convex lenses.

In another embodiment the canteen is a combination of a first canteen and a second canteen. The first canteen has an outer side wall and an inner side wall, a top portion, and a bottom portion, defining an interior therein, wherein the top portion and the bottom portion allow passage of light. The first canteen has an open central portion. The second canteen has sides, a top portion, and a bottom portion, defining an interior therein, wherein the top portion and the bottom portion allow passage of light. The second canteen is positioned reversibly or permanently in the open central portion of the first canteen. A divider in the interior of the first canteen forms a first chamber and a second chamber in the interior of the first canteen. The divider in the first canteen allows passage of light and the second chamber of the first canteen forms a fire starting lens in combination with the divider. A divider in the interior of the second canteen forms a first chamber and a second chamber in the interior of the second canteen. The divider in the second canteen allows passage of light and the second chamber of the canteen forms a fire starting lens in combination with the divider. The lenses in the first canteen and the second canteen can be solid lenses, water lenses, or a combination thereof. The divider in the first canteen has an opening for filling the second chamber in the first canteen with water. The side in the second canteen has an opening for filling the second chamber in the second canteen with water. The fire starting lens in the first canteen and in the second canteen are convex lenses and they combine to form a functional single lens.

In another embodiment the canteen has sides, a top portion, and a bottom portion, forming an interior therein. The top and bottom portions are convex shaped and are transparent to light. The interior is a single water fire starting lens. Light emitting from either the top or bottom portion is focused. The interior forms a biconvex water fire starting lens in a thick-lens shape and acts as magnifying glass.

In another embodiment the canteen is a combination of a first canteen and a second canteen. The first canteen has an outer side wall and an inner side wall, a top portion, and a bottom portion, defining an interior therein, wherein the interior forms a section of a thick biconvex lens magnifying glass as well as a water fire starting lens. The first canteen has an open central portion. A second canteen has sides, a top portion, and a bottom portion, defining an interior therein, wherein the interior forms a section of a thick biconvex magnifying glass as well as a water fire starting lens. The second canteen is positioned reversibly or permanently in the open central portion of the first canteen. The top portion in the first canteen and in the second canteen are convex with respect to the associated interior for that portion. The bottom portion of the water fire starting water lens in the first canteen and in the second canteen are convex with respect to the associated interior for that portion. The top portion in the first canteen and in the second canteen combine to form a top boundary of a functional single lens. The bottom portion in the first canteen and in the second canteen combine to form a bottom boundary of a functional single lens.

An advantage of the canteen of the present invention is that it can be used to start fire as well as carry water.

Another advantage is a canteen that has two chambers, one to carry water and the other to both carry water and start fire. In some embodiments the chamber used solely to carry water is very much larger than the fire starting lens compartment. A camper can drink almost all of the water and still be able to start a fire.

Another advantage is a canteen that is composed of an inner canteen and an outer canteen which can be separated to form two canteens that camping partners can each use to carry water and start fire.

Another advantage is that in some embodiments some chambers can be drained of water so that they cannot start a fire thus improving fire safety. Later, the fire lens compartment can be filled with water and used to start a fire. This feature allows the fire starting ability to be switched on and off at will.

Another advantage of some embodiments is that the fire starting lens is in the form of a magnifying glass. The camper can use the canteen to inspect small objects. Boy or Girl Scouts, geologists, and biologists can use the canteen to inspect objects of interest.

Another advantage of some embodiments is that the fire starting lens requires a minimal volume of liquid. Any liquid with the correct optical characteristics can be used, even urine. Even if the small fire starting compartment has been contaminated the other, larger chamber can still be used to store potable water.

Another advantage is that if the canteen is not broken and if there is sunlight and fuel, then the camper can always start a fire. Unlike some other means of starting fire which use expendable ingredients this method will never use up its components. A popular means to start a fire is to use a magnesium stick combined with a flint. The magnesium is eventually all used and/or the flint wears out. That method also requires a piece of metal to strike against the flint (which might not be available).

Another advantage is that some embodiments of this canteen should be less expensive to manufacture than some alternative types of fire starters. This in turn means that it will be easier for consumers to afford to own and use it. Since this particular invention keeps people alive who would otherwise die from thirst or from freezing to death then this is a notable advantage.

DETAILED DESCRIPTION OF THE INVENTION

While the following description details the preferred embodiments of the present invention, it is to be understood that the invention is not limited in its application to the details of its structure and construction described herein, since the invention is capable of other embodiments and of being practiced in various ways.

Figure 1:
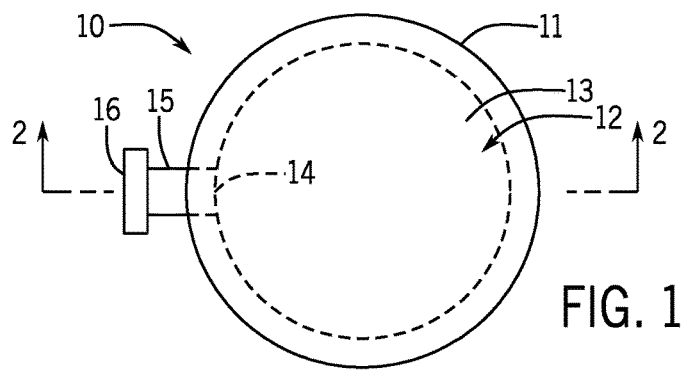
FIG. 1 shows a top view of the canteen of the present invention.
Figure 2:
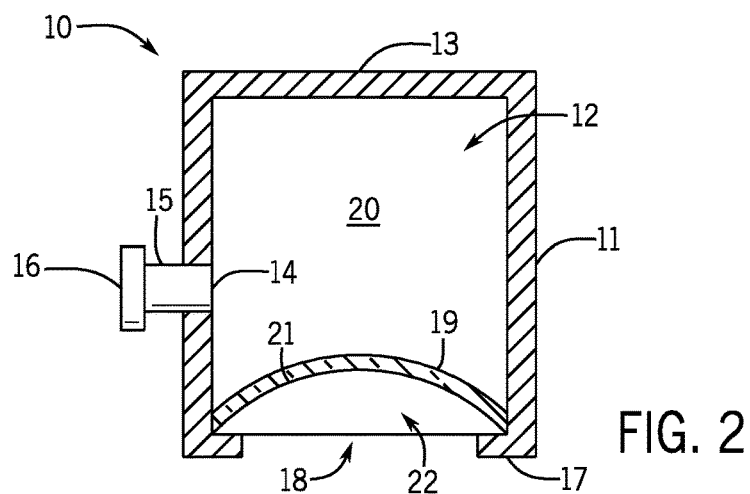
FIG. 2 shows a sectional view of the canteen having a solid fire starting lens.
Figure 3:
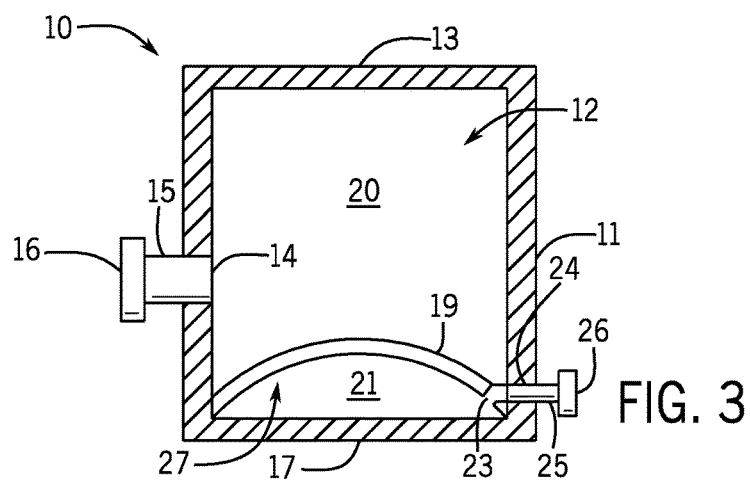
FIG. 3 shows a sectional view of the canteen having a water fire starting lens.

FIG. 1 shows a top view of the canteen 10 of the present invention. The canteen 10 is shown as circular having sides 11, and interior 12, and a top portion 13. The side 11 has an opening 14 attached to a spout 15 having a cap 16. FIG. 2 shows a sectional view of canteen 10 having a bottom portion 17 with an opening 18. The top portion 13, the bottom portion 17, and the sides 11 form the interior 12. A divider 19 is positioned within the interior 12 to divide the interior 12 into two chambers, an upper chamber 20 and a lower chamber 21. The canteen in FIG. 2 is shown having a solid fire starting lens 22 in the lower chamber 21. FIG. 3 shows the canteen 10 having a water fire starting lens 27 in the lower chamber 21. The divider 19 has an opening 23 and the side 11 has an opening 24 which are attached to a spout 25 having a cap 26. The bottom portion 17 does not have an opening. The solid fire starting lens 22 and the water fire starting lens 27 are, preferably, convex lenses.

The top portion 13 and the bottom portion 17 are transparent and allow the passage of light. Light, such as sunlight, passes through the top portion 13, through the solid fire starting lens 22 or the water fire starting water lens 27, and through the bottom portion 17. As light passes through these lenses it is focused at a point beyond the bottom portion 17 where the light generates enough heat to create fire in any suitable type of tinder. Spout 15 in the upper chamber 20 and spout 24 in the lower chamber 21 are used to fill these chambers with fluid, such as water, and to empty them. When the lower chamber 21 is filled with water, the convex shaped divider 19 plus the water in the lower chamber 21 form a fire starting lens.

Figure 4:
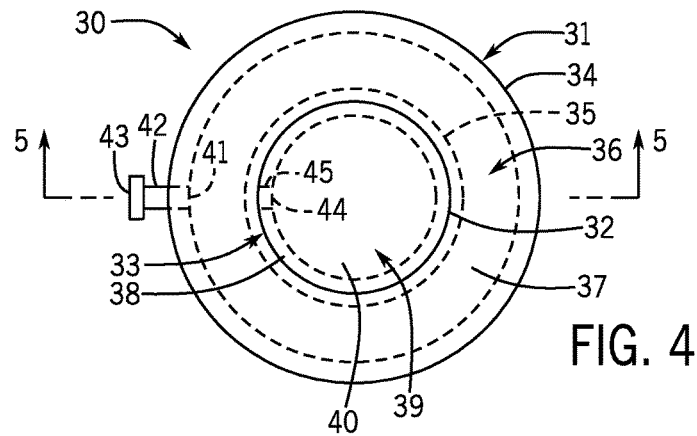
FIG. 4 shows a top view of an alternate embodiment of the canteen of FIG. 1, comprising an outer canteen and an inner canteen.

FIG. 4 shows a top view of an alternate embodiment 30 of the canteen 10 of FIG. 1, comprising an outer canteen 31 and an inner canteen 33. The outer canteen 31 has an outer side wall 34, an inner side wall 35, an interior 36, a top portion 37, and an open central area 32. The inner canteen 33 is reversibly or permanently positioned in the open central area 32 of the outer canteen 31 and has a side wall 38, an interior 39, and a top portion 40. The outer side wall 34 has an opening 41 attached to a spout 42 having a cap 43. The side wall 38 has an opening 44 with a plug 45.

Figure 5:
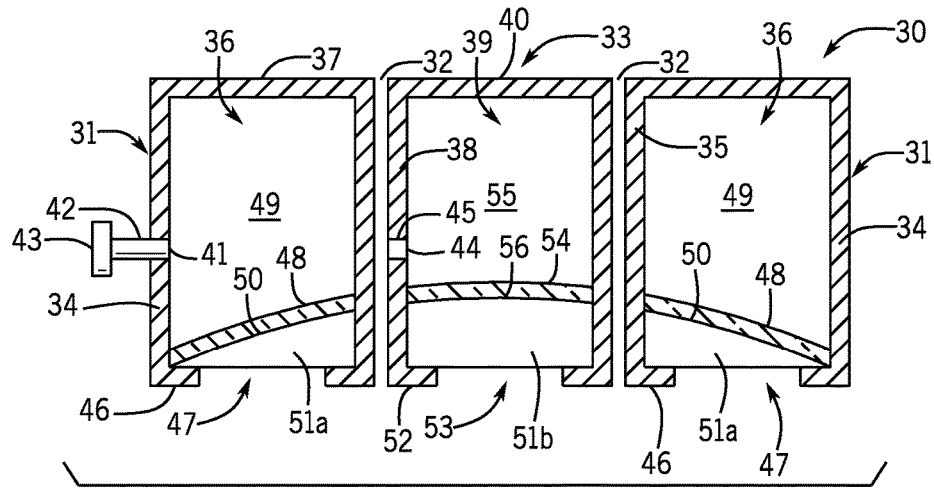
FIG. 5 shows a sectional view of the canteen of FIG. 4 having solid fire starting lenses.
Figure 6:
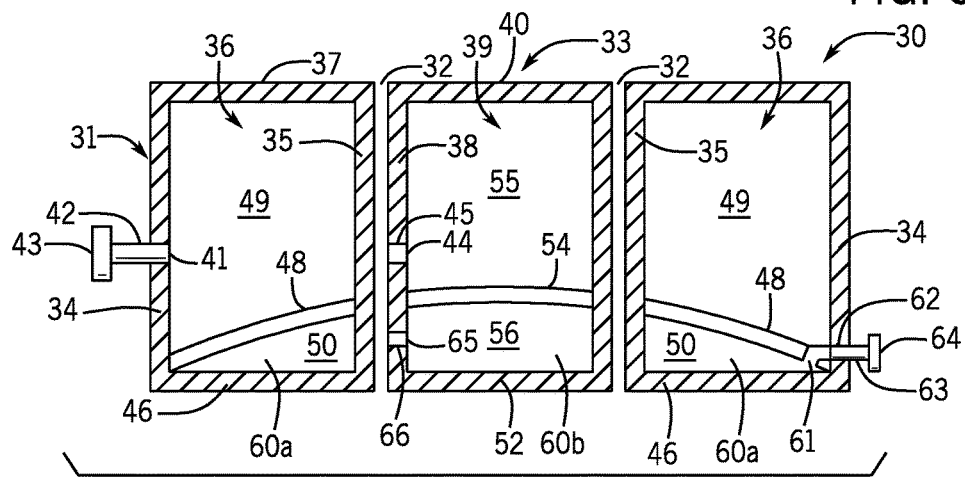
FIG. 6 shows a sectional view of the canteen of FIG. 4 having fire starting water lenses.

FIG. 5 shows a sectional view of the canteen 30 of FIG. 4 having solid fire starting lenses 51a and 51b. FIG. 5 also shows the outer canteen 31 having a bottom portion 46 and the inner canteen 33 having a bottom portion 52. The top portion 37, the bottom portion 46, the outer side wall 34, and the inner side wall 35 of the outer canteen 31 define the interior 36 of the outer canteen 31. The top portion 40, the bottom portion 52, and the side wall 38 of the inner canteen 33 define the interior 39 of the inner canteen 33. FIG. 6 shows the canteen 30 having a water fire starting lens 60a in the lower chamber 50 of the outer canteen 31 and a water fire starting lens 60b in the lower chamber 56 of the inner canteen 33. The divider 48 in the outer canteen 31 has an opening 61 and the side 34 has an opening 62, each of which connects with a spout 63 having a cap 64. The divider 54 forms a top of lower chamber 56 and connects only to side wall 38. The side wall 38 of the inner canteen 33 has an opening 65 into lower chamber 56 with a plug 66. The bottom portions 46 and 52 do not have openings which are used only with solid lenses. The solid fire starting lenses 51a and 51b and the water fire starting lenses 60a and 60b are, preferably, convex lenses.

The top portions 37 and 40 and the bottom portions 46 and 52 are transparent and allow the passage of light. Light, such as sunlight, passes through the top portions 37, 33, through the solid fire starting lenses 51a, 51b or the water fire starting lenses 60a, 60b, and through the bottom portions 46, 52. As light passes through these lenses it is focused at a point beyond the bottom portions 46, 52 where the light generates enough heat to create fire in any suitable type of tinder. Spout 42 in the upper chamber 49 and spout 62 in the lower chamber 50 in the outer canteen 31 are used to fill these chambers with fluid, such as water, and to empty them. When the lower chamber 50 is filled with water, the convex shaped divider 48 plus the water in the lower chamber 50 form a fire starting lens. Opening 44 in the upper chamber 55 and opening 65 in the lower chamber 56 in the inner canteen 33 are used to fill these chambers with fluid, such as water, and to empty them. When the lower chamber 56 is filled with water, the convex shaped divider 54 plus the water in the lower chamber 56 form a fire starting lens. The solid fire starting lens 51a in the outer canteen 31 and the solid fire starting lens 51b in the inner canteen 33 combine to form a functional single lens. The water fire starting lens 60a in the outer canteen 31 and the water fire starting lens 60b in the inner canteen 33 combine to form a functional single lens.

Figure 7:
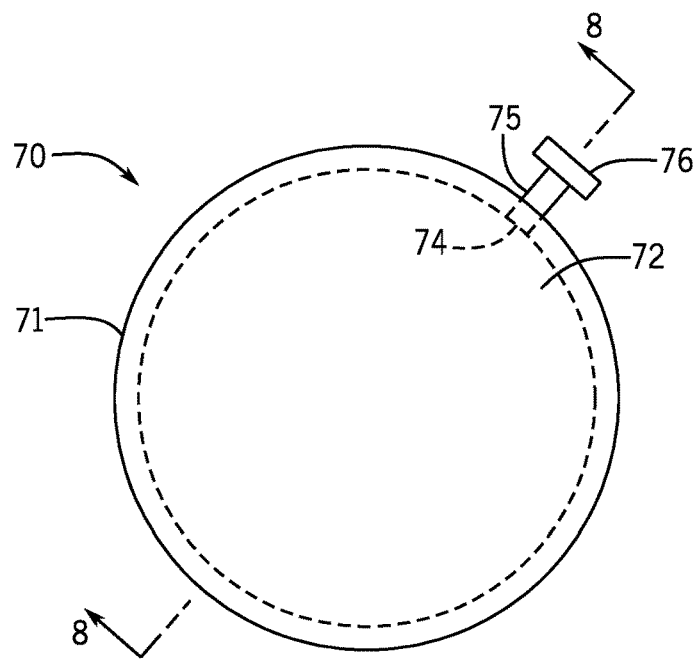
FIG. 7 shows a top view of an alternate embodiment of the canteen of FIG. 1 with the top portion having an upwardly pointing convex shape and the bottom portion having a downwardly pointing convex shape.
Figure 8:
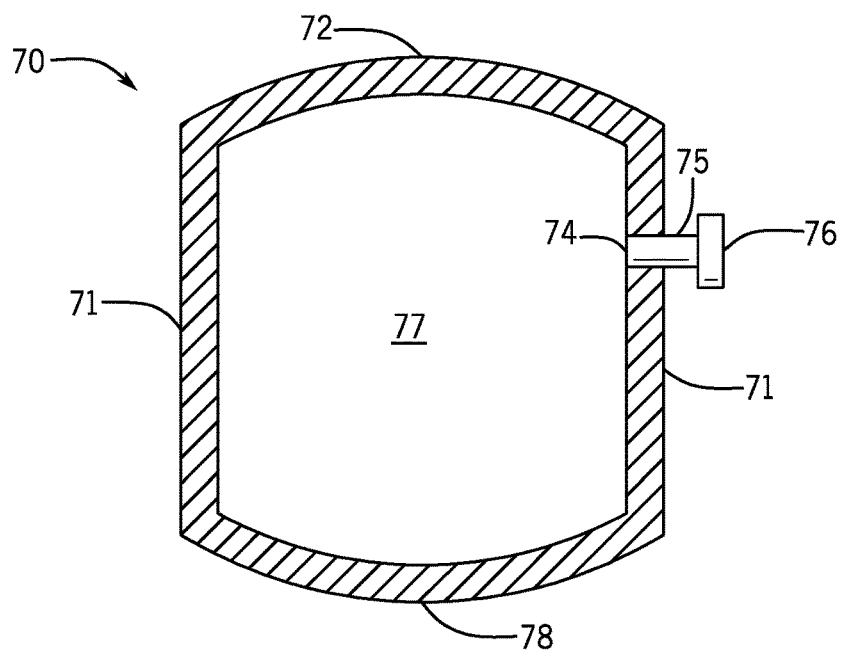
FIG. 8 shows a sectional view of the canteen of FIG. 7.

FIG. 7 shows a top view of an alternate embodiment 70 of the canteen 10 of FIG. 1. Canteen 70 has sides 71 and a top portion 72. Side 71 has an opening 74 with a spout 75 and cap 76. FIG. 8 shows a sectional view of canteen 70, further showing a bottom portion 78. An interior 77 is formed by the top portion 72, the bottom portion 78, and the sides 71. The top portion 72 and the bottom portion 78 each have a convex shape and are transparent to light so that the canteen 70 can form a biconvex water fire starting lens. The top portion 72 and the bottom portion 78 act together to focus light at a point beyond the bottom portion 78 to create fire in any suitable type of tinder.

Figure 9:
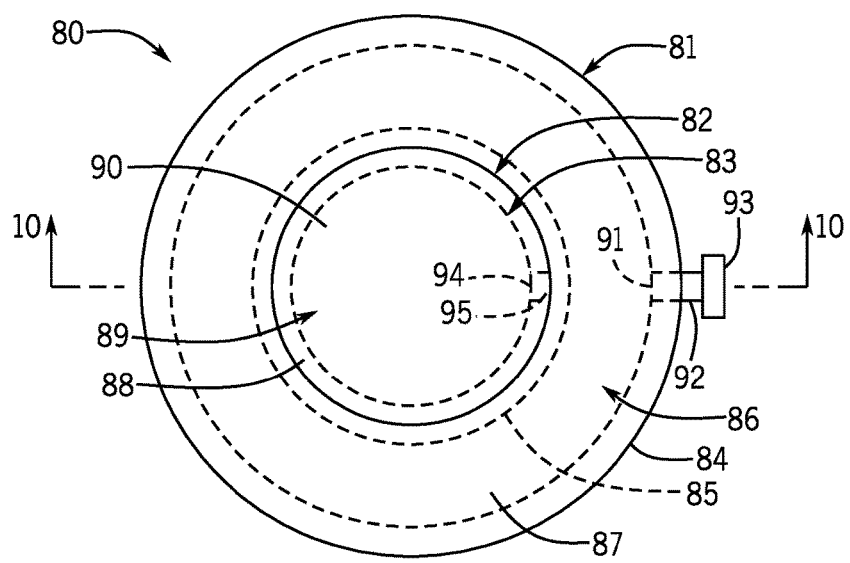
FIG. 9 shows a top view of an alternate embodiment of the canteen of FIG. 7, comprising an outer canteen and an inner canteen.

FIG. 9 shows a top view of an alternate embodiment 80 of the canteen of FIG. 7, comprising an outer canteen 81 and an inner canteen 83. The outer canteen 81 has an outer side wall 84, an inner side wall 85, an interior 86, a top portion 87, and an open central area 82. The inner canteen 83 is positioned in the open central area 82 of the outer canteen 81 and has a side wall 88, an interior 89, and a top portion 90. The outer side wall 84 has an opening 91 attached to a spout 92 having a cap 93. The side wall 88 has an opening 94 with a plug 95.

Figure 10:
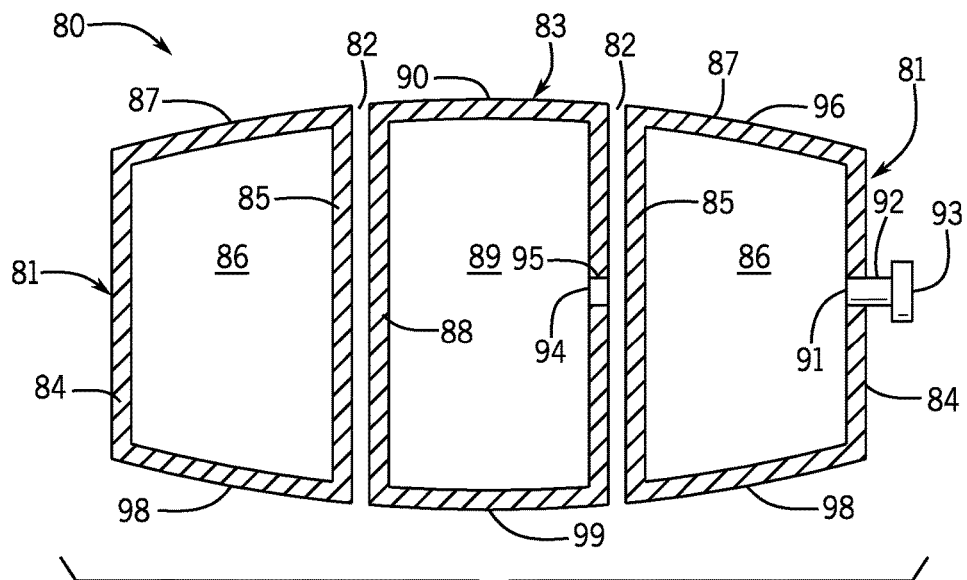
FIG. 10 shows a sectional view of the canteen of FIG. 9

FIG. 10 shows a sectional view of canteen 80. FIG. 10 further shows the outer canteen 81 having a bottom portion 98 and the inner canteen 83 having a bottom portion 99. The interior 86 of the outer canteen is formed by the top portion 87, the bottom portion 98, and the side walls 84 and 85. The interior 89 of the inner canteen 83 is formed by the top portion 90, the bottom portion 99, and the side wall 88. The top portion 87 and the bottom portion 98 of the outer canteen 81 each have a convex shape so that the outer canteen 81 forms a biconvex water fire starting lens. The top portion 90 and the bottom portion 99 of the inner canteen 83 each have a convex shape so that the inner canteen 83 forms a biconvex water fire starting lens. The top portion 87 of the outer canteen 81 and the top portion 90 of the inner canteen 83 can form a single convex shape. The bottom portion 98 of the outer canteen 81 and the bottom portion 99 of the inner canteen 83 can form a single convex shape. Thus, the canteen 80 can function as a single biconvex water fire starting lens.

The canteens of the present invention have transparent top and bottom portions which allow the passage of light sufficient for using solid lenses or water lenses to use light to ignite fire by methods know in the art. The entire canteen can be transparent and allow the passage of light if desired. The canteen can be made of any suitable plastic or metal. Any suitable type of plastic, glass, or crystal can be used to form the solid lenses or the convex divider. The lenses can be convex, concave, or a combination thereof. The water can be replaced by any other suitable liquid. The upper chamber is used to store water and the lower chamber is used as a fire starting water lens and for the storage of water. In the embodiments having an outer canteen and an inner canteen, the canteens can be used in combination or separately to start fires. Although the canteens are shown as circular they can be formed in any desired shape and size. The convex divider forms a fire starting water lens in combination with the lower chamber filled with water. The size and shape of the divider and lower chamber can be varied as desired to generate the desired focal properties of the fire starting water lens.

The foregoing description has been limited to specific embodiments of this invention. It will be apparent, however, that variations and modifications may be made, by those skilled in the art, to the disclosed embodiments of the invention, with the attainment of some or all of its advantages and without departing from the spirit and scope of the present invention.

The invention claimed is:

1. A canteen, comprising:
   a) sides, a top portion, and a bottom portion defining an interior therein, wherein said top portion and said bottom portion allow passage of light;
   b) a convex-shaped divider in said interior forming a first chamber and a second chamber within said interior, wherein said divider allows passage of light; and
   c) said second chamber forms a fire starting lens, wherein when light passes through said top portion, through said divider, and through said bottom portion, said lens is constructed to focus light beyond said bottom portion sufficiently to create fire outside the canteen.

2. The canteen of claim 1 wherein said fire starting lens is a solid lens.

3. The canteen of claim 1 wherein said fire starting lens is a water lens wherein the water has a convex shape.

4. The canteen of claim 1 further comprising said divider having an opening for filling said second chamber with water.

5. The canteen of claim 1 wherein said fire starting lens is a convex lens.

6. The canteen of claim 2 wherein said bottom portion has an opening.

7. A canteen, comprising:
   a) sides, a top portion, and a bottom portion defining an interior, wherein said top portion and said bottom portion allow passage of light;
   b) a convex-shaped divider in said interior forming a first chamber and a second chamber within said interior, wherein said divider allows passage of light;
   c) said second chamber forms a fire starting lens in combination with said divider wherein said fire starting lens is a water lens, wherein when light passes through said top portion, through said divider, and through said bottom portion, said lens is constructed to focus light beyond said bottom portion sufficiently to create fire outside the canteen; and
   d) said divider has an opening for filling said second chamber with water.

8. The canteen of claim 7 wherein said fire starting lens is a convex lens wherein the water of the fire starting lens has a convex shape.

* * * * *